United States Patent [19]

Balasubramanian et al.

[11] Patent Number: 4,608,578
[45] Date of Patent: * Aug. 26, 1986

[54] BRAKED MEDIA TRANSPORT FOR LASER SCANNERS

[75] Inventors: N. Balasubramanian, Saratoga; Alan L. Helgesson, Mountain View, both of Calif.

[73] Assignee: Matrix Instruments Inc., Orangeburg, N.Y.

[*] Notice: The portion of the term of this patent subsequent to Mar. 19, 2002 has been disclaimed.

[21] Appl. No.: 665,746

[22] Filed: Oct. 29, 1984

Related U.S. Application Data

[63] Continuation-in-part of Ser. No. 551,266, Nov. 14, 1983, Pat. No. 4,505,578.

[51] Int. Cl.[4] .............................................. G01D 15/14
[52] U.S. Cl. ..................... 346/160; 346/108; 350/486; 91/364
[58] Field of Search ........... 346/160, 766, 134, 139 A, 346/139 B, 108; 358/293, 302; 355/51, 43, 53; 350/485–487, 6.5–6.91; 91/364, 361, 458; 360/107; 369/226

[56] References Cited

U.S. PATENT DOCUMENTS

| | | | |
|---|---|---|---|
| 3,541,580 | 11/1970 | Saito | 346/134 |
| 4,202,247 | 5/1980 | Hunkar et al. | 91/364 |
| 4,348,697 | 9/1982 | Takahashi et al. | 346/139 B |
| 4,505,578 | 3/1985 | Balasubramanian | 346/134 |

Primary Examiner—Arthur G. Evans
Attorney, Agent, or Firm—Thomas Schneck

[57] ABSTRACT

A servo system for a braked accelerative transport in which a signal representing velocity of a carriage within the transport is compared to a first reference signal representing desired carriage velocity. The comparison yields an error signal which is used to adjust the brake of the transport. A hydraulic valve having an adjustable needle is used as the brake. A second selectable reference signal is provided so that the first reference signal can be bypassed when the carriage is reset at high velocity or is at reset. The valve is also bypassed on reset so that the adjusted brake mechanism is left intact on reset.

20 Claims, 7 Drawing Figures

BRAKED MEDIA TRANSPORT FOR LASER SCANNERS

CROSS REFERENCE TO RELATED APPLICATION

This application is a continuation-in-part of prior application Ser. No. 551,266 filed Nov. 14, 1983, now U.S. Pat. No. 4,505,578.

TECHNICAL FIELD

The invention relates to laser writing and reading systems and in particular to an apparatus for establishing uniform velocity in a transport providing relative motion between a laser beam and a photosensitive medium.

BACKGROUND ART

Because of the dramatic drop in cost of computer memory, it is becoming more economical and efficient to store film data in computer archival storage than in the film media itself. For example, in a large hospital hundreds of X-ray images are made every day. In the past these X-ray films were often stored indefinitely. It has been recognized that computer storage of such films is preferable if an image can be read and reconstructed with accuracy. Computer storage of such images is accomplished by laser writing and reading systems.

Laser writing and reading systems are known. For example, see U.S. Pat. No. 4,225,224 to N. Balasubramanian. Such systems commonly use photosensitive media for pre-recorded data being read or for writing new data. In either case, it is typical that a laser beam must rapidly scan the media, which is either reflective or transmissive of laser light.

The laser beam usually scans the medium by means of scanning optics, typically a scanning mirror or a rotating polygonal wheel having reflective surfaces. Such scanning is along a line extending across the width of the medium. To attain areawise media coverage, the medium is advanced relative to the beam, preferably in synchronism. Once a line has been scanned, the medium, usually film, is incrementally advanced a slight distance and an adjacent line is scanned. This is usually accomplished by mounting the film on a drum and rotating the drum by a slight amount after each line scan. Rotation is carried out by a stepper or other type of motor until the entire film has been scanned.

A problem with this approach is that the motor introduces a slight amount of vibration to the film, no matter how smooth the motor may be. This vibration causes film jitter which is seen on the film as lines, sometimes interfering with the ability to read data. In all cases it is easier to read data when there is no mechanical vibration of the film.

To solve this problem, prior application Ser. No. 551,266, now U.S. Pat. No. 4,505,578 disclosed a method and apparatus of providing relative motion between a scanning beam and a photosensitive medium which is virtually free from vibration. Rather than advancing film by means of motors or the like, a transport relies on gravity for providing a vibration-free force to obtain relative motion. Yet gravity alone is insufficient because gravity provides acceleration. For film scanning, a uniform velocity is required so that the scan position can be accurately known. A hydraulic brake is used to place drag on falling mass associated with a carriage carrying either the photosensitive medium or the read/write optical system.

A mass associated with a carriage is supported over a hydraulic cylinder and piston, the cylinder containing hydraulic fluid. The mass falls downwardly in the earth's gravitational field, working against the piston. A valve is connected to the hydraulic cylinder metering the flow of hydraulic fluid from the cylinder due to work done by the piston. The rate of fluid flow is such that the valve acts as a brake limiting the rate of fall of the piston and hence the carriage. If the read/write optical system is mounted on the carriage, the photosensitive medium is mounted in a fixed position in optical communication therewith, or vice versa.

The falling mass and hence the carriage is free from detectable vibration as measured on the photosensitive medium. While formerly vibration manifested itself in the form of faint lines streaking the medium resembling a raster effect, the present invention shows no similar lines and enhances the signal-to-noise ratio of laser written and read data.

A problem which is encountered is that wear on mechanical components of the transport, temperature differences in the hydraulic fluid passing through the valve and perhaps other effects cause small velocity variations in the transport. Such variations mean data inaccuracies in reading or recording data, since motion of the transport is assumed to be uniform.

An object of the invention was to devise a means for offsetting small perturbations causing velocity non-uniformity in the transport.

SUMMARY OF INVENTION

The above object has been met by providing a velocity controlling servo system associated with a recording media transport subject to acceleration by a force such as gravity, a compressed gas or a compressed spring. The transport includes a movable carriage whose motion may be braked with a variable braking element responsive to the servo control circuit.

Velocity information for the carriage is measured using a position encoder connected to the transport. A voltage representing velocity is fed to a difference amplifier which also receives an input from a reference source. This source generates a signal representing a desired velocity. The difference between the desired velocity and the measured velocity is an error signal which is applied to the variable braking element through an actuator.

When the transport is reset, a different reference voltage may be applied to allow fast reset of the transport, without having to significantly change the variable braking element.

The system of the present invention provides for the virtual elimination of velocity errors in the transport, thereby improving data recording and retrieval.

BEST MODE FOR CARRYING OUT THE INVENTION a. Braked Gravity Transport

The following is a description of a braked gravity transport as set forth in prior application Ser. No. 551,266.

Figure 1:
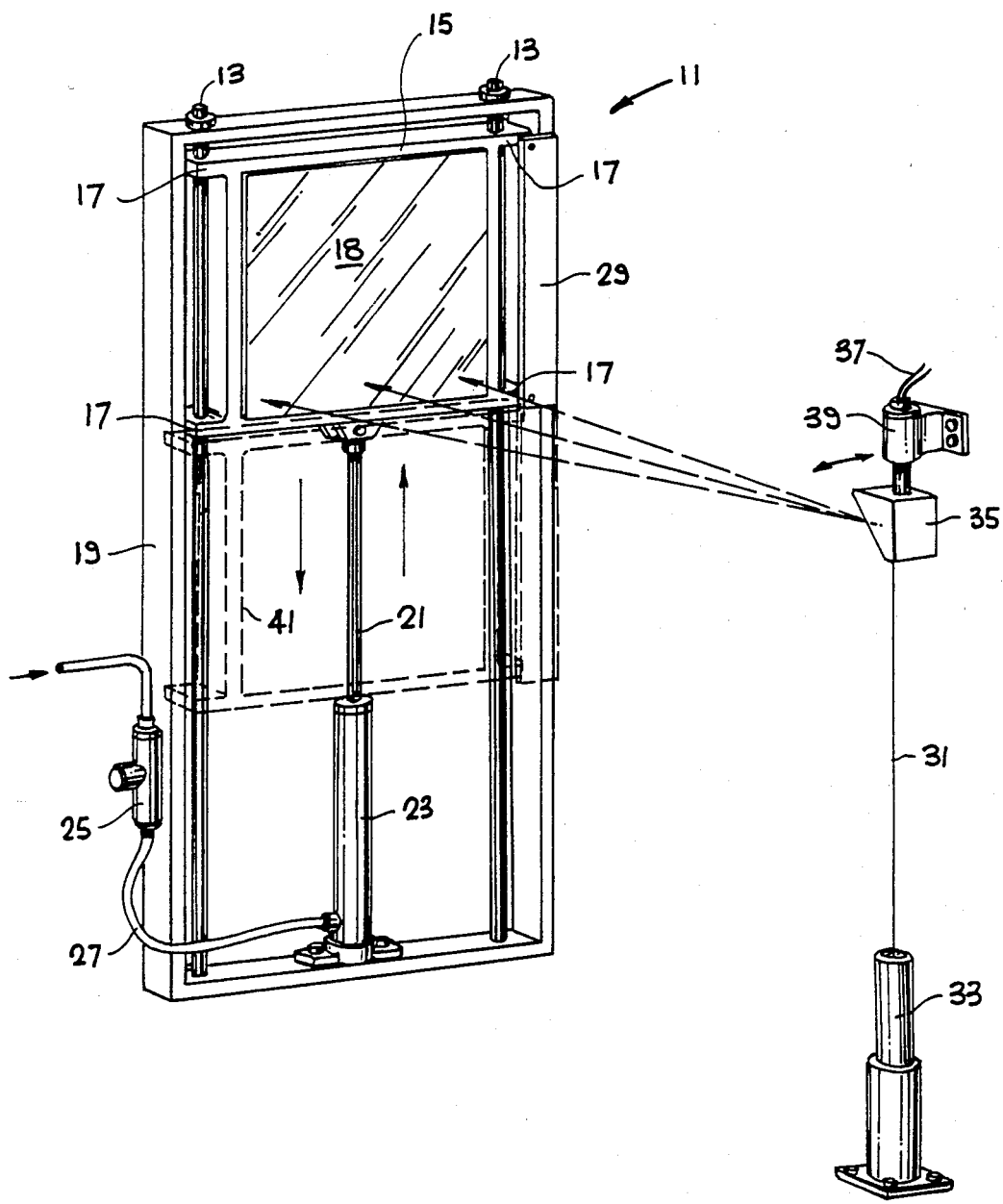
FIG. 1 is a perspective view of a first embodiment of a braked gravity transport.

With reference to FIG. 1, a transport 11 may be seen which includes a carriage 15 mounted between and guided by parallel, spaced-apart rails 13. Carriage 15 includes a rectangular frame adapted for carrying material, such as a photosensitive medium 18 which occupies the central portion of the carriage. The frame is connected to rails 13 by means of bosses 17 which project outwardly from the rectangular portion of the frame. The bosses have apertures with internal bearings for sliding along rails 13 with a minimum amount of vibration. In turn, rails 13 are supported within a box-like structure 19 which maintains the spacing and positioning of the rails. Carriage 15 has an associated mass. This mass may be the carriage's own mass derived from the carriage material or may be an auxiliary mass such as a weight connected to the carriage.

The mass associated with the carriage is intended to fall in the earth's gravitational field and work against a piston 21 which has a movable end within cylinder 23. This cylinder is filled with hydraulic fluid below the piston which is forced out of the cylinder when the piston falls. The hydraulic fluid is a liquid. Adjustable valve 25 is connected to cylinder 23 by means of line 27. The purpose of valve 25 is to limit fluid flow from the cylinder to a desired, steady flow which may be accurately adjusted. The rate of flow is such that the rate of all of the mass associated with the carriage is braked by the valve. This may be done by providing a needle valve wherein a movable needle controls the size of an orifice through which fluid flows. By means of very small orifices, the rate of fall of the carriage may be limited. It is important to have an adjustable orifice so that the rate of fall of the carriage may be synchronized with the scanning rate. A linear encoder 29 may be positioned adjacent to carriage 15. The position encoder 29 is fixed relative to structure 19. Typically, such position encoders have a lengthwise array of parallel equally spaced rulings which may be read optically as a marker on carriage 17 moves past the rulings. For example, black parallel lines on a transparent background may be read by a movable source and detector, crossing the lines. As lines are crossed, light from the source is interrupted and the detector registers a pulse. Detectors of this type have resolutions on the order of hundreths of a millimeter. The output from such a device is an electrical signal representing the position of carriage 15 relative to encoder 29 which is fixed with respect to rails 13. This allows the position of the carriage to be known relative to the rails and relative to fixed members of the system.

The photosensitive medium 18 is scanned by a beam 31 generated by laser 33. The laser may be a low power helium-neon laser or any laser whose radiation is compatible with reading or writing on photosensitive medium 18. The beam is deflected by a galvanometer mirror 35, electrically driven by a motor 39 electrically controlled over wires 37. The manner of scanning with such a mirror is described in prior U.S. Pat. No. 4,225,224.

In operation, scanning is continuous in a horizontal line transverse to the direction of fall of the carriage. The velocity of the carriage is almost uniform except for minor variations described below. Valve 25 is limiting the flow of fluid therethrough to a relatively low amount so that scanning of the film may be in synchronism with a data transfer rate from a computer or data storage device. Such a device provides signals which are modulated onto a laser beam 31 by a laser modulator, not shown. Mirror 35 is driven by galvanometer 39 at a known rate such that pixels on the photosensitive material 18 can be addressed at the data rate. The spacing of the pixels depends on the sensitivity of the film. For very sensitive film, such as aerial photography film, the pixels are closely spaced. On the other hand, pixels are more widely spaced when using low resolution film, such as medical X-ray film. A beam detector may be placed at lateral edges of the film for signalling lateral interception of the beam and causing reversal of the beam deflection. Ordinarily, edges of the scanning path are known from prior calibration and these limits are preset in the galvanometer. In either case, the vertical beam position on the photosensitive medium is known both from the linear encoder 29 and the position of the galvanometer mirror as signalled on lines 37.

While the laser 33 has been described above as a writing beam, a similar beam, without a modulator, could be used for reading a photosensitive medium, such as exposed and developed film. In this case, a detector is positioned behind medium 18. Such a detector could be one or more CCD linear arrays. By means of calibration, the line for the linear array may be determined for a known rate of fall of carriage 15. The amount of light transmission through the film gives an optical density reading, allowing digital storage of information on the photosensitive material for subsequent reconstruction.

For example, medical X-rays may be read by the apparatus of the present invention and the information stored on such X-rays may be placed in a mass storage unit associated with a digital computer. The mass storage unit is preferably of the archival type, suitable for very long-term storage. The original photosensitive medium, after having been read, may be salvaged. In the case of X-ray film, any silver thereon may be reclaimed.

After the carriage 15 falls and the photosensitive medium is scanned by beam 31 the carriage reaches the position indicated by the dashed lines 41. The carriage then may be reset by raising it, preferably by hydraulic means.

Figure 2:
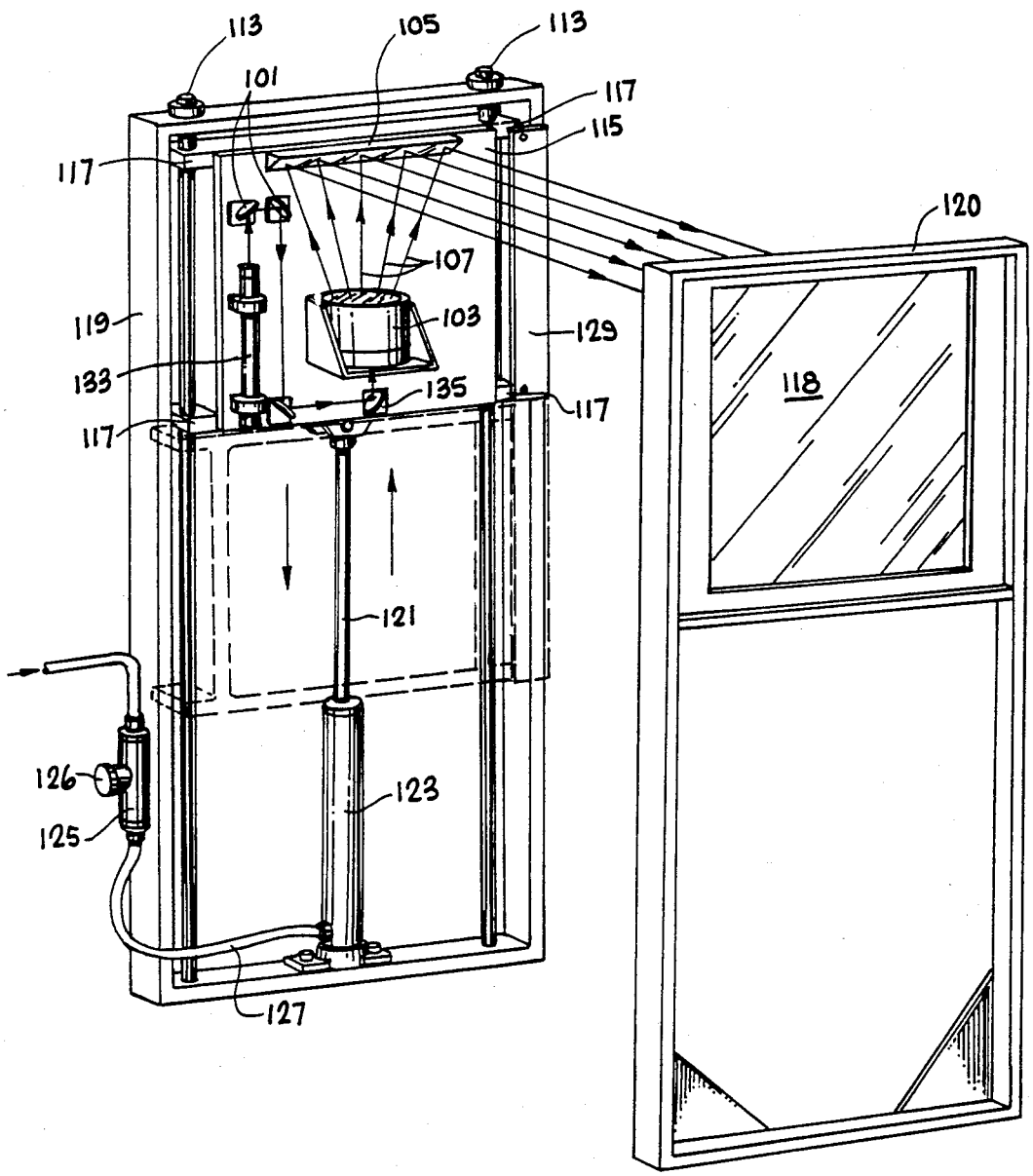
FIG. 2 is a perspective view of a second embodiment of a braked gravity transport.

With reference to FIG. 2, a reversal of the optical components may be seen. In this case, photosensitive medium 118 is stationary, being mounted on fixed holder 120, and the laser 133 and associated optics are mounted on movable carriage 115. The important consideration is that either the laser or the photosensitive medium be mounted on the carriage and the other mounted in a fixed position relative to the other and in optical communication with the other. In this case, laser 133 directs light toward mirrors 101 and ultimately to the scanning galvanometer mirror 135. A condensing lens 103 directs the light to an elongated prism 105 where the light is reflected toward photosensitive medium 118. The prism should have a length sufficient to accommodate the full width of the deflected beam indicated by arrows 107. The laser associated optics are fastened to a panel which in turn is mounted on carriage 115. As previously mentioned, the carriage is mounted on rails 113 by means of bosses 117 having internal bearings in contact with the rails. A position encoder 129 signals the relative position of the carriage with respect to the support structure 119.

Piston 121 supports the mass of the carriage. In turn, the piston is supported by fluid within a hydraulic cylinder 123. Hydraulic cylinder 123 has an exit port allowing escape of hydraulic fluid through line 127 to valve 125. An adjustable needle valve 126 controls the escape of hydraulic fluid due to the mass associated with the carriage pushing down on piston 121.

In operation, carriage 115 is allowed to fall under the influence of the earth's gravitational field. The mass of the carriage pushes downwardly on piston 121, causing displacement of hydraulic fluid from cylinder 123 through tube 127 and through valve 126. The needle valve is adjusted so that escape of fluid occurs at a rate such that the downward fall of the piston 121 is braked and the carriage falls at a uniform velocity. If the carriage were not braked, it would fall with acceleration due to gravity. Such acceleration would prevent the laser beam from writing or reading the photosensitive medium at a uniform rate. Thus, the braking action of the hydraulic cylinder serves to produce uniform writing on a photosensitive material without the mechanical vibration inherent in motors. The motion associated with the transport of the present invention is extremely smooth and free of mechanical vibration, except that which is picked up from the surrounding environment. To minimize such effects, shock mountings may be used of the type used to support laser optics. In many environments, this is not needed.

Figure 3:
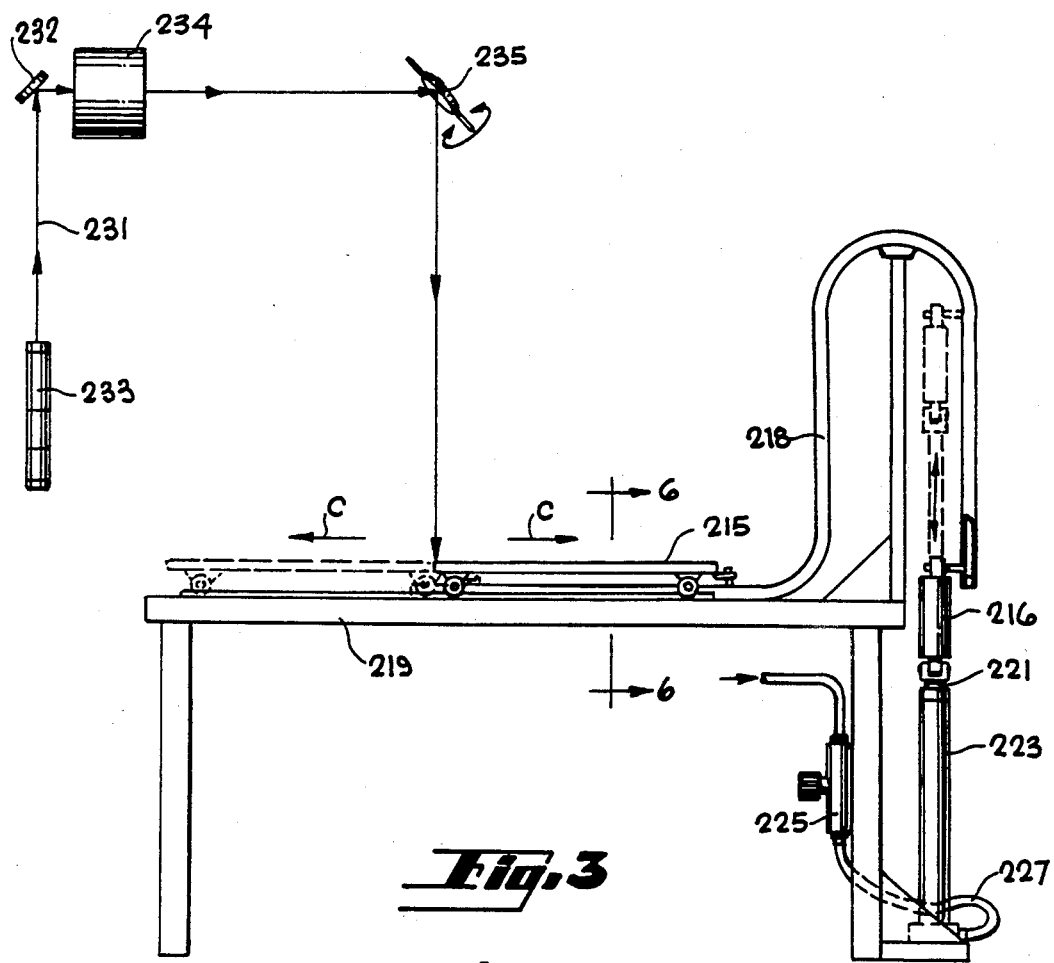
FIG. 3 is a side view of a third embodiment of a braked gravity transport.

While the descriptions in FIGS. 1 and 2 show the carriage being vertically disposed, FIG. 3 illustrates a carriage which is horizontally disposed. With reference to FIG. 3, the carriage 215 is supported on a structure 219, such as a table. Carriage 215 is connected to a mass 216 which is free to fall in the earth's gravitational field. A cable, within a slotted tube 218 connects the carriage to the mass. Mass 216 is connected to one end of a piston 221, having another end within cylinder 223. This cylinder is filled with hydraulic fluid below the piston which is displaced outwardly through tube 227 as the piston is pushed downwardly by the mass. An adjustable needle valve 225 limits fluid flow to a rate such that the mass 216 falls with uniform velocity.

A laser 233 is mounted in a relatively fixed position and has a beam 231 directed onto mirror 232 and focussing lens 234. A galvanometer mirror 235 is positioned for deflecting beam 231 downwardly onto a path transverse to arrows C which indicate the motion of carriage 215.

In FIG. 3, the carriage is intended to carry photosensitive media, such as film which is scanned by the deflected beam 231. However, the photosensitive medium could be placed in a fixed position and the laser mounted on the carriage, as in FIG. 2. In this situation, the movable beam would scan the fixed media.

Figure 4:
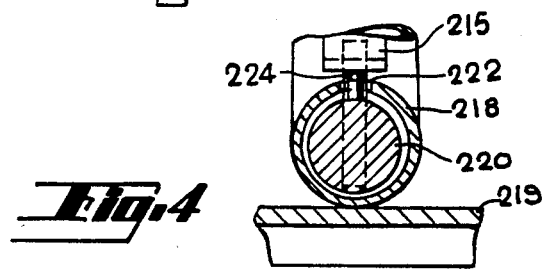
FIG. 4 is a detail of a carriage propelling assembly used in the apparatus of FIG. 3.
Figure 5:
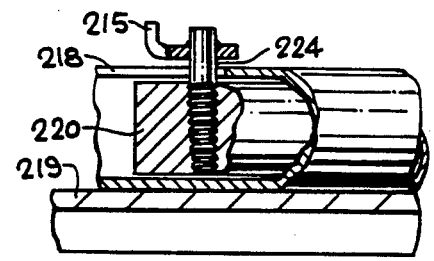
FIG. 5 is a side view of the detail illustrated in FIG. 4.
Figure 6:
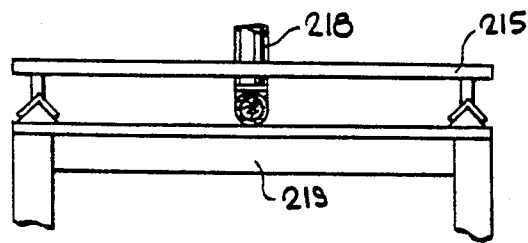
FIG. 6 is a sectional view of the apparatus shown in FIG. 3, taken along lines 6—6.

With reference to FIGS. 4, 5 and 6, cable 220 is seen within tube 218. The tube has a slot 222 which is just large enough to accommodate a pin 224 which, on one side, is anchored within cable 220, and on the other side, is attached to carriage 215. Tube 218 is fastened to support structure 219 for a linear distance which defines the path over which the carriage moves. The carriage has sliding ways which are constrained to support structure 219 such that the carriage cannot lift therefrom when the tube 218 rises from the table. Also, the carriage ways may be blocked at the end of the pre-defined path needed to allow scanning of the photosensitive medium by the beam. An optical encoder, not shown, provides positioning information of the carriage relative to the beam.

From the embodiment illustrated in FIGS. 3–6, it may be seen that the photosensitive medium or the optics may be horizontally disposed, while still using a braked gravity motion system. In using such a system, the faint lines on photosensitive media, indicative of vibrational streaking, evident in the prior art are no longer seen even though the photosensitive medium is scanned in a raster pattern. The transport enhances the signal-to-noise ratio by more accurately locating pixels to be read or written.

Gravity is not the only accelerative force which can be used. Compressed gas or a compressed spring will drive the carriage in a similar manner. These forces produce accelerations in a carriage which are braked as described herein.

b. Velocity Error Correction System

While the system described above gives good results, there can be short and long term velocity variations in the transport mechanism due to the effects of temperature, friction, mechanical stress, changes in hydraulic fluid viscosity and the like. To stabilize velocity we have found that servo-control of the variable valve is useful.

Figure 7:
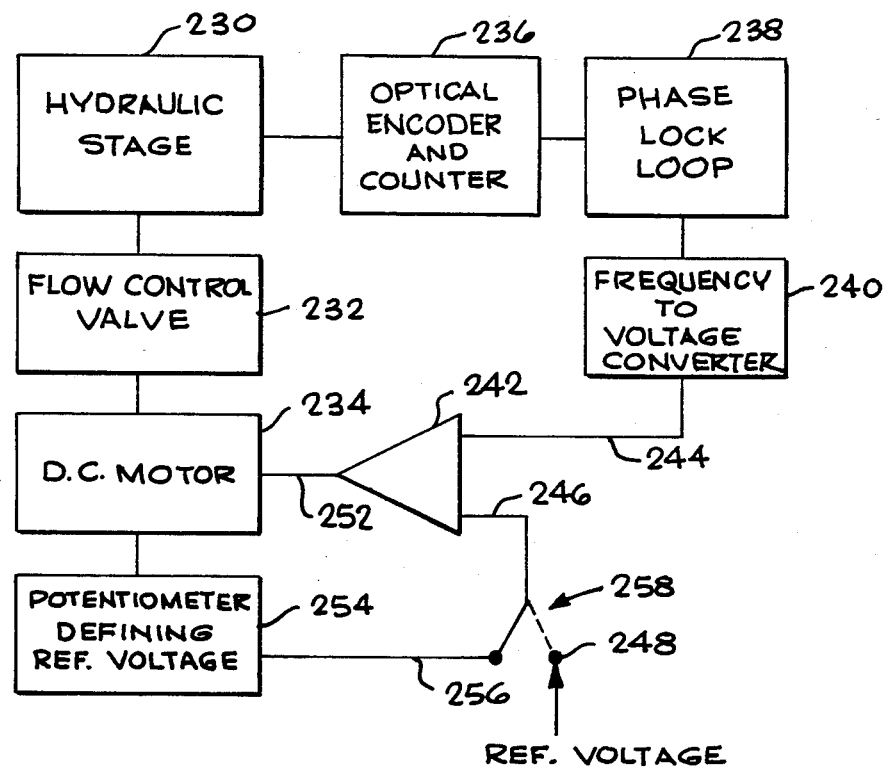
FIG. 7 is a block diagram of the circuit of the present invention.

With reference to FIG. 7, the block labeled 230 represents the piston and cylinder 21 and 23; 121 and 123 of FIGS. 1 and 2. Block 232 represents the valve having an adjustable element, such as the needle valve previously described wherein a movable needle controls the size of an orifice through which hydraulic fluid flows. The position of the needle is adjusted by a d.c. motor 234 which can cause the movable needle to change position very gradually. For example, if the needle is provided with fine threads, the d.c. motor may turn the needle, advancing or retracting the needle in accord with a signal which is provided to the motor.

As previously explained, the piston is connected to a movable carriage. The carriage has its position measured by an optical encoder, which together with a count rate circuit is represented by block 236. The optical encoder comprises an array of closely spaced parallel lines. As a light source moves past the lines, an optical pulse train is generated. By counting the pulses relative to a reference or starting position, an electrical position signal may be generated. A count rate, determined by a clocked count rate circuit associated with the encoder, is proportional to the transport velocity.

The velocity signal, i.e. an a.c. count rate signal, is stabilized by a phase lock loop 238. Such a loop includes a voltage controlled oscillator (VCO) which is designed to maintain zero difference in phase between the input signal and the local VCO signal. Any phase difference is used to adjust the oscillator frequency by means of feedback. The VCO tends to lock onto an input signal and thus will produce a uniform output signal, free from minor velocity variations. The VCO includes a low pass filter which produces a signal which is spectrally cleaner than the input signal. Since line spacings in the encoder may vary from encoder to encoder, a divider circuit may optionally be provided to divide the VCO output to a desired level. The signal from the phase lock loop 238 is transmitted to a frequency-to-voltage converter 24 which produces a d.c. output signal whose voltage magnitude represents velocity of the transport. This signal is fed to a difference amplifier 242 along an input line 244. Simultaneously, another input is applied to difference amplifier 242 through line 246. This signal is a reference voltage supplied from the reference voltage source connected at terminal 248 while the carriage is in motion during the scan mode. The reference voltage represents a desired or target velocity for the carriage. When the reference voltage is compared to the velocity voltage signal along line 244, any difference detected by the difference amplifier 242 becomes an output signal from the amplifier, taken along line 252. This output signal, a velocity error signal, is used to control motor 234 which provides corrective force to the movable element of control valve 232. The valve is opened or closed to an extent which reduces the error signal. Motor 234 is a brake actuator inasmuch as it operates the variable element of flow control valve 232. This flow control valve is the system braking element.

Simultaneously, the d.c. motor turns the wiper of a potentiometer 254 which generates another reference voltage at terminal 256. This reference voltage is intended to balance not the carriage velocity from moving in response to the acceleration of gravity, but to balance the resetting of the carriage to its original position, which usually occurs at a velocity much greater than the former velocity. For example, the reset velocity may be ten times the velocity experienced during gravitational or other slow accelerative movement of the carriage. Rather than requiring a large adjustment of the movable element of the flow control valve 232, a bypass element is provided in the valve such that fluid flow may move through the valve, essentially bypassing it. Since the carriage velocity is much greater and since the movable element of the valve is bypassed, there is no need to adjust the movable element during the reset procedure. A switch 258 selects either the first reference voltage at terminal 248 or the reset voltage at terminal 256, depending on the direction the carriage is to be moved. During the reset operation, or whenever the carriage is at rest, the voltage supplied at terminal 256 represents the desired starting velocity for the carriage. This allows the phase lock loop to more quickly lock onto a signal representing carriage velocity once the carriage is in motion during the scan mode.

By maintaining servo control of the variable valve, velocity variations in the transport are virtually eliminated.

We claim:

1. Apparatus comprising; carriage for moving a data recording or storage member relative to a laser beam, the carriage mounted for motion propelled by accelerative force, with its motion braked by a brake having a variable braking element,
    means for measuring carriage velocity and having an output signal representing said carriage velocity,
    servo control means for comparing said output signal representing velocity to a reference signal in order to generate a velocity error signal, and
    a carriage brake actuator connected to receive said velocity error signal and connected to the variable braking element of the transport brake, the actuator being responsive to the velocity error signal in changing the variable braking element to reduce the velocity error signal.

2. The apparatus of claim 1 wherein said brake actuator is a motor and said variable braking element of the transport brake is a variable needle in a needle valve, the needle valve metering the flow of hydraulic fluid from a piston and cylinder braking the fall of said carriage.

3. The apparatus of claim 1 wherein said means for measuring carriage velocity comprises a linear position encoder connected to a phase lock loop, said phase lock loop having means for generating a velocity signal from the position encoder.

4. The apparatus of claim 1 wherein said servo control means comprises a difference amplifier, the difference amplifier receiving a first input from said means measuring carriage velocity and a second input from a reference voltage source, the output of the difference amplifier forming said velocity error signal.

5. The apparatus of claim 4 wherein said difference amplifier has a selectable input reference voltage, as said second input, including a first reference voltage supplied when the carriage is moving in a first direction and a second reference voltage supplied when the carriage is moving in a second direction relative to its starting position and when the carriage is at rest.

6. The apparatus of claim 5 wherein said second reference voltage is supplied through a potentiometer mechanically linked to said actuator for supplying an adjustable second reference voltage which is proportional to the amount of actuator response.

7. A servo controlled transport for moving a recording medium relative to a light source comprising,
    a carriage propelled by an accelerative force, said carriage moving along a predefined path,
    braking means connected to the carriage for braking the accelerative force to a uniform velocity, said braking means having a variable braking element,
    a laser having optical means for scanning in a line, transverse to the direction of motion of the carriage,
    a photosensitive medium disposed to receive said scanning line from the laser, with the laser or said photosensitive medium mounted on said carriage, the other mounted in a fixed position in optical communication with the first,
    means for measuring carriage velocity and having an output signal representing said carriage velocity,
    servo control means for comparing said output signal representing velocity to a reference signal in order to generate a velocity error signal, and
    a carriage brake actuator connected to receive said velocity error signal and connected to the variable braking element of the transport brake, the actuator being responsive to the velocity error signal in changing the variable braking element to reduce the velocity error signal.

8. The apparatus of claim 7 wherein said brake actuator is a motor and said variable braking element of the transport brake is a variable needle in a needle valve, the needle valve metering the flow of hydraulic fluid from a piston and cylinder braking the fall of said carriage.

9. The apparatus of claim 7 wherein said means for measuring carriage velocity comprises a linear position encoder connected to a phase lock loop, said phase lock loop having means for generating a velocity signal from the position encoder.

10. The apparatus of claim 7 wherein said servo control means comprises a difference amplifier, the difference amplifier receiving a first input from said means measuring carriage velocity and a second input from a reference voltage source, the output of the difference amplifier forming said velocity error signal.

11. The apparatus of claim 7 wherein said difference amplifier has a selectable input reference voltage, as said second input, including a first reference voltage supplied when the transport is moving in a first direction and a second reference voltage supplied when the transport is moving in a second direction relative to its starting position and when the transport is at rest.

12. The apparatus of claim 7 wherein said second reference voltage is supplied through a potentiometer mechanically linked to said actuator for supplying an adjustable second reference voltage which is proportional to the amount of actuator response.

13. Apparatus comprising; transport for moving a data recording or storage member relative to a laser beam, the transport having a carriage propelled by an accelerative force, means for measuring carriage velocity and having an output signal representing said carriage velocity, servo control means for comparing the said output signal representing velocity to a reference signal in order to generate a velocity error signal, a hydraulic piston and cylinder connected to the carriage for braking the acceleration of the carriage, the hydraulic piston and cylinder having a variable valve metering the flow of hydraulic fluid therethrough, and a carriage brake actuator connected to receive said velocity error signal and connected to the variable valve, the actuator being responsive to the velocity error signal in changing the variable valve to reduce the velocity error signal.

14. The apparatus of claim 13 wherein said brake actuator is a motor.

15. The apparatus of claim 14 wherein said variable valve is a needle valve having a movable needle for adjustable metering of hydraulic fluid flow through the valve, said movable needle controlled by said motor.

16. The apparatus of claim 13 wherein said servo control means comprises a difference amplifier, the difference amplifier receiving a first input from said means measuring carriage velocity and a second input from a reference voltage source, the output of the difference amplifier forming said velocity error signal.

17. The apparatus of claim 13 wherein said difference amplifier has a selectable input reference voltage, as said second input, including a first reference voltage supplied when the transport is moving in a first direction and a second reference voltage supplied when the transport is moving in a second direction relative to its starting position and when the transport is at rest.

18. The apparatus of claim 13 wherein said second reference voltage is supplied through a potentiometer mechanically linked to said actuator for supplying an adjustable second reference voltage which is proportional to the amount of actuator response.

19. The apparatus of claim 7 wherein said accelerative force is gravitational force.

20. The apparatus of claim 13 wherein said accelerative force is gravitational force.

* * * * *